United States Patent
Kelly et al.

(10) Patent No.: US 10,915,956 B2
(45) Date of Patent: *Feb. 9, 2021

(54) ALGORITHMIC MODEL TO ALLOW FOR ORDER COMPLETION AT SETTLEMENT OR AT CLOSE USING EXCHANGE MANDATED RULES FOR SETTLEMENT DETERMINATION

(71) Applicant: FIDESSA TRADING UK LIMITED, London (GB)

(72) Inventors: Kristin Kelly, Middletown, NJ (US); Yuriy Shterk, Cos Cob, CT (US)

(73) Assignee: FIDESSA TRADING UK LIMITED, London (GB)

( * ) Notice: Subject to any disclaimer, the term of this patent is extended or adjusted under 35 U.S.C. 154(b) by 87 days.

This patent is subject to a terminal disclaimer.

(21) Appl. No.: 16/405,305

(22) Filed: May 7, 2019

(65) Prior Publication Data

US 2019/0259101 A1 Aug. 22, 2019

Related U.S. Application Data

(63) Continuation of application No. 14/939,370, filed on Nov. 12, 2015, now Pat. No. 10,332,207.
(Continued)

(51) Int. Cl.
*G06Q 40/04* (2012.01)
(52) U.S. Cl.
CPC .................................. *G06Q 40/04* (2013.01)
(58) Field of Classification Search
CPC ........... G06Q 40/04; G06Q 40/00; G07F 7/10
(Continued)

(56) References Cited

U.S. PATENT DOCUMENTS 7,496,531 B1 * 2/2009 Gastineau .............. G06Q 40/00
705/35
8,595,120 B1 * 11/2013 Newell .................. G06Q 40/04
705/37
(Continued)

OTHER PUBLICATIONS

Intraday Futures Volatility and Theories of Market Behavior. Robert T. Daigler. The Journal of Futures Markets, vol. 17, No. 1, 45-74. (Year: 1997).*
(Continued)

*Primary Examiner* — Alexander G Kalinowski
*Assistant Examiner* — John O Preston
(74) *Attorney, Agent, or Firm* — Baker Botts L.L.P.

(57) ABSTRACT

A system and method for managing and processing Market-On-Close orders for financial instruments by dynamically employing trading strategies according to settlement rules for financial instruments is provided. Techniques disclosed can include the use of an execution model that allows a trader to submit a MOC order using a trading system. The trading system can be configured to store settlement and validation rules corresponding to a given trading instrument and/or exchange and can be configured to execute the order according to the rules specified by an exchange. The model disclosed herein can rely on exchange mandated settlement rules and settlement times, can accept the order prior to the settlement time, and can manage the order according to parameters and details of the execution model and the settlement rules specified by an exchange for a given instrument.

20 Claims, 5 Drawing Sheets

Related U.S. Application Data (60) Provisional application No. 62/079,388, filed on Nov. 13, 2014.
(58) Field of Classification Search
USPC .............................................. 705/37; 463/25
See application file for complete search history.

(56) References Cited

U.S. PATENT DOCUMENTS

2004/0128223 A1* 7/2004 Kuhn .................... G06Q 40/04
705/37
2016/0314530 A1* 10/2016 Blank .................... G06Q 40/04

OTHER PUBLICATIONS

VWAP Strategies. Ananth Madhavan. Institutional Investor Journals, Inc. www.iijournals.com (Year: 2002).*
Market Structure and the Intraday Pattern of Bid-Ask Spreads for NASDAQ Securities. K.C. Chan, William Christie, and Paul H. Schultz. The Journal of Business, vol. 68, No. 1 (Jan. 1995), pp. 35-60. (Year: 1995).*
U.S. Appl. No. 14/939,370 (U.S. Pat. No. 10,332,207), filed Nov. 12, 2015 (Jun. 25, 2019).
U.S. Appl. No. 14/939,370, May 7, 2019 Issue Fee Payment.
U.S. Appl. No. 14/939,370, Feb. 7, 2019 Notice of Allowance.
U.S. Appl. No. 14/939,370, Aug. 6, 2018 Response to Non-Final Office Action.
U.S. Appl. No. 14/939,370, Jul. 30, 2018 Applicant Initiated Interview Summary.
U.S. Appl. No. 14/939,370, Jun. 27, 2018 Non-Final Office Action.
Intraday Futures Volatility and Theories of Market Behavior. Robert T. Daigler. The Journal of Futures Markets, 17(1):45-74 (1997).
Market Structure and the Intraday Pattern of Bid-Ask Spreads for NASDAQ Securities. K.C. Chan, William Christie, and Paul H. Schultz. The Journal of Business, 68(1):35-60 (1995).
VWAP Strategies. Ananth Madhavan. Institutional Investor Journals, Inc. (2002).

* cited by examiner

ALGORITHMIC MODEL TO ALLOW FOR ORDER COMPLETION AT SETTLEMENT OR AT CLOSE USING EXCHANGE MANDATED RULES FOR SETTLEMENT DETERMINATION

CROSS REFERENCE AND RELATED APPLICATIONS

The present application is related to U.S. Provisional Application No. 62/079,388 filed on Nov. 13, 2014 and U.S. patent application Ser. No. 14/939,370, filed Nov. 12, 2015, now allowed, each of which is incorporated herein by reference in its entirety and from each of which priority is claimed.

BACKGROUND

Field of Disclosed Subject Matter

The disclosed subject matter relates generally to trading systems configured to manage Market-On-Close (referred to herein as MOC) orders. The novel trading systems can be implemented on a plurality of exchanges and markets.

Description of Related Art

Traditional Market-On-Close (MOC) models allow traders to submit orders to be completed at or very close to the close time of the electronically traded instrument. For example, a trader can submit a MOC order prior to the end of the market day on a particular exchange.

Certain exchanges support native MOC orders. That is, for example, the trader can submit a MOC order directly to an exchange, and the exchange will execute the order as a market order, or in some cases, a limit order as close to the end of the market day as possible.

Certain exchanges do not support native MOC orders. However, MOC models exist that allow a trader to place an order such that it is executed with the use of an algorithm designed to determine and place one or more orders with the exchange very close to the end of the market day. In these scenarios, the algorithms typically run on computing platforms co-located with the exchange. These computing platforms are typically controlled by an entity to which a trader subscribes, whereby the trader can communicate with the computing platform via a network. One of skill in the art will appreciate, however, that a variety of other arrangements are suitable, such as communicating orders to a broker that executes the orders accordingly.

Traditional MOC models can be suitable in connection with instruments for which marking-to-market (settlement) is performed at the end of the trading day. For example, in connection with the trading of futures, an exchange or clearing house can determine the settlement price of an asset covered by futures contracts at the end of the trading day, such that the gains and losses on the futures contract can be reflected in the accounts of the parties involved.

For certain instruments, such as some futures instruments, however, the official end of day mark to market (settlement price) can be determined before the end of trading day during the settlement period. Moreover, exchanges can specify different rules that apply to settlement calculation for individual instruments (or group of products). In these instances, traders may desire to submit specific orders with product specific parameters to be executed around the settlement period. For example, a trader may desire to complete an order at or better than settlement price or another predetermined benchmark. Traditional MOC models, however, can fail to account for exchange specified instrument level parameters or instrument specific rules. Thus, manual intervention by the trader trading across one or more exchanges can be labor intensive and costly.

Accordingly, there is a need for improved techniques for management of MOC orders according to settlement rules for financial instruments in the technological field of electronic trading.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the presently disclosed subject matter relates to techniques for the management of the trading of financial instruments, and more particularly to techniques for management of MOC orders according to settlement and validation rules for financial instruments.

In one aspect of the disclosed subject matter, techniques for management of MOC orders can include the use of an execution model that allows a trader to submit a MOC order using a trading system. The trading system can be configured to store settlement rules corresponding to a given trading instrument and/or exchange and can be configured to execute the order according to the rules specified by an exchange. The execution model as herein disclosed can rely on exchange mandated settlement rules and settlement times, can accept the order prior to the settlement time, and can manage the order according to parameters and details of the execution model and the settlement rules specified by an exchange for a given instrument.

The disclosed techniques can allow an order to be executed at or better than a determined settlement price without the need for a user to control all of the various exchange mandated rules, times and parameters.

According to one aspect of the disclosed subject matter, a method for managing MOC orders is provided. The method can comprise storing in a trading system comprising one or more computing devices one or more settlement rules associated with one or more exchanges, wherein the one or more settlement rules are associated with one or more financial instruments traded on the one or more exchanges. The method as disclosed herein next comprises receiving by the trading system a MOC order having one or more order parameters, where the order parameters identify at least an exchange and a financial instrument. As embodied herein, the method further comprises determining by the trading system, based on one or more of the stored settlement rules corresponding to the identified exchange, the identified financial instrument and/or other static data associated with the identified financial instrument, a closing strategy. Based on the one or more of the stored settlement rules corresponding to the identified exchange and the identified financial instrument, the determined closing strategy and/or other static data associated with the financial instrument, the trading system determines a closing strategy release time and provisions an execution model by which to execute the order.

In one embodiment, executing an execution model can include validating the one or more orders based on exchange specific validation rules as part of an integrated order management system, and transmitting one or more validated orders directly to an exchange. In another embodiment, executing the execution model can include validating the one or more orders and transmitting one or more validated orders to a broker that executes the one or more orders according to the execution model. Executing the execution model can further include compliance and reporting of the executed order by the trading system to a given regulatory and/or reporting entity. Executing the execution model can additionally include rejecting the one or more orders based on the exchange specific validation rules. The transmitting can include communicating the one or more validated orders according to a standardized electronic messaging protocol.

According to another aspect of the disclosed subject matter, a system for managing MOC orders is provided. The system can generally comprise a storage component, a processing component, and at least one computing device coupled via a network to an exchange. The storage component can be configured to store market data, one or more settlement and/or validation rules associated with one or more exchanges, and one or more settlement rules associated with one or more financial instruments traded on the exchanges. The at least one computing device of the disclosed subject matter can provide a trading client configured to receive one or more order parameters for generating one or more MOC orders based on user input, such as user-defined parameters, and default parameters. The at least one computing device can transmit the one or more MOC orders to the processing component of the trading system.

As embodied herein, the trading client can comprise one or more computing devices configured to define order parameters via an entry dialog box and/or alternatively configured to communicate order parameters according to a standardized electronic messaging protocol.

The processing component of the disclosed subject matter can be configured to receive the one or more MOC orders and determine, based on the one or more order parameters, the one or more settlement rules, and the identified financial instrument, a closing strategy. Based on the one or more of the stored settlement rules corresponding to the identified exchange and the identified financial instrument, the determined closing strategy, and/or other static data associated with the financial instrument, the processing component can determine a closing strategy release time and dynamically provision an execution model by which to execute the one or more MOC orders. According to an embodiment, the trading system is communicably coupled to the one or more exchanges and is configured to directly execute one or more MOC orders to the one or more exchanges or, alternatively, transmit the one or more orders to a broker that executes the one or more orders according to the provisioned execution model.

According to another embodiment, the trading system can include a data feed for receiving and transmitting data concerning financial instruments and/or the one or more exchanges. The data feed can be configured to execute push software for periodically transmitting financial instrument data to the storage component, processing component, and/or the at least one computing device.

According to another embodiment, one or more software components can be configured in the one or more trading system components or computing devices to modify or cancel an order entry message generated by a trading client before the order is executed.

According to yet another embodiment, one or more software components can be configured in the one or more trading system components or computing devices to provide communication via a standardized electronic messaging protocol, such as FIX or SWIFT, and alternatively or additionally via an entry dialog box.

DETAILED DESCRIPTION

Reference will now be made in detail to the various exemplary embodiments of the disclosed subject matter, exemplary embodiments of which are illustrated in the accompanying drawings.

The techniques for management of MOC orders disclosed herein can include a trading system adapted to receive, manage, and/or process MOC orders from one or more traders on one or more exchanges. The trading system can include, for example, one or more computing devices, servers, mobile devices, cloud based devices, or the like, which include one or more processors, one or more storage components, and one or more network connections. In certain embodiments, the trading system can include, for example, one or more computing devices co-located with one or more exchanges. Additionally or alternatively, the trading system can include one or more computing devices coupled to one or more exchanges via a network. The trading system can include one or more storage components adapted to store exchange mandated settlement and/or validation rules for financial instruments traded on the exchanges. The trading system can be adapted to communicate, via a network, with one or more traders and receive, via the network, MOC orders from the traders. The trading system can process and manage the MOC orders in accordance with an execution model to optimally set a closing strategy and closing strategy release time for executing the MOC orders according to the type of financial instrument, exchange specific settlement rules, order parameters, and/or other static data associated with the financial instrument. The trading system can further directly execute the orders on the exchanges, or indirectly, such as for example and not limitation, through a broker.

In an exemplary embodiment, for purpose of illustration and not limitation, the trading system can store settlement rules specified by a plurality of exchanges for a plurality of financial instruments. For example and not limitation, in connection with futures and options, exchanges may determine the settlement price of an instrument by taking the last sale price or quote price at the electronic market close, by averaging the price over a short interval prior to close, by calculating the volume weighted average price (VWAP)

over a short interval prior to close, by taking the price of a closing cross/auction, by performing calculations related to a volatility curve, or by other means known in the industry. Execution models and algorithms to determine how and when to execute one or more orders to match or beat the settlement price, or other predetermined benchmark, are generally known in the industry for a given settlement price calculation. In connection with the disclosed subject matter, these models can be dynamically employed based on the exchange mandated settlement rules stored in the trading system.

By way of example and not limitation, in connection with certain exemplary embodiments, if an instrument's daily settlement calculation is identified as last trade price, or if there is no settlement process identified, or the user defines an alternate closing strategy release time, the trading system disclosed herein can be adapted to run an execution model to meet or be better than a predetermined benchmark, such as the closing price of the financial instrument. Descriptions of certain exemplary individual closing strategies are given below for purpose of illustration and not limitation. In accordance with the disclosed subject matter, the trading system can be adapted to employ a strategy selection logic guided by data describing daily settlement calculation and appropriate settlement duration. This data can be defined as the instrument's closing strategy and can be maintained centrally within the trading system.

Figure 1:
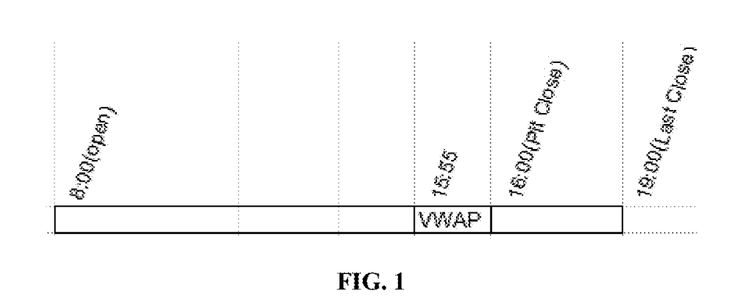
FIG. 1 is an illustration of a closing strategy of one or more embodiments.

In an exemplary embodiment, the trading system can implement the VWAP closing strategy in situations where an exchange's Pit Close/Daily Settlement Price, or closing price, is calculated as a volume weighted average of trades over some defined time-window, or settlement window leading up to the Pit Close Time. The Default VWAP closing strategy can be used when an instrument settles against the Last Trade, when there is no provided closing strategy or when the user has identified an alternative closing strategy release time. For example and not limitation, for an instrument with an Open Time of 08:00, a Last Close Time of 19:00, a Pit Close of 16:00 and a VWAP closing strategy with a 5-minute duration, the MOC order can work the order during the 5 minutes leading into the close, ending at the Pit Close time of 16:00, as illustrated by FIG. 1.

Additionally or alternatively, a closing strategy of "Auction" can be implemented to participate in the exchange's Closing Auction to achieve the Daily Settlement Price, or closing price. This closing strategy can be implemented, for example, when the settlement rule specifies that the settlement price is calculated as the last contract price in the ordinary auction trading session if trades are submitted during the closing auction, or else if no trades are submitted then calculated based on bid offers made during the closing auction. This closing strategy can slice the order within a predetermined time before the Market Close, which can be a user-defined close time. In connection with an exemplary embodiment, slicing of the order can occur immediately before the Market Close. One of skill in the art will appreciate that, as used in this context, "immediately" before the Market Close can be, for example, 100 ms.

For purpose of illustration and not limitation, an example of the logic employed in an exemplary trading system upon receipt of a MOC order is described below.

In this exemplary system, the closing strategy can first be determined. The closing strategy can be determined by, for example, retrieving the instrument's closing strategy data from the trading system, such as from a centralized database or server. The closing strategy can be determined as the Default VWAP strategy if (i) the user has manually set the Close Time; (ii) the Closing Strategy is not available from the trading system; (iii) the request for Closing Strategy data is rejected by the trading system; (iv) the user chose Market Close, and a Pit Close (VWAP Closing Strategy) is available from the trading system; or (v) the provided strategy is Last Trade. Otherwise, the closing strategy retrieved from the trading system can be used. For example, this can be a Timed VWAP, Last Trade (e.g., against the Market Close) or blank. In certain embodiments it could also be Auction with a related Auction time in the future. If the user-requested Applicable Close Time is Pit Close, and there is no available Pit Close (e.g., if the trading system data does not return a Timed VWAP), the order entry can be rejected.

Next, the closing strategy release time can be determined. For example and not limitation, if the closing strategy is Default VWAP, the closing strategy release time can be defined by a VWAP duration calculation based on the market close or settlement time. The VWAP, is calculated for a given time span defined relative to the given close time or settlement time for a given exchange, where different exchanges have different timing rules for close and settlement. The VWAP represents the total traded value divided by the total traded quantity during the trading session defined by the exchange specific close or settlement time. In one example, the closing strategy release time can be determined by calculating the VWAP duration prior to the Market Close, a user-defined close time, and optionally can be recalculated after every trade that occurs during the working period.

In certain exemplary embodiments, certain financial instruments, such as futures contracts, can have both intraday mark to market (settlement) determination prior to the close of a trading session and end of day mark to market. In connection with these exemplary embodiments, the techniques disclosed herein can include use of an execution model to allow a user to indicate which of the periods the order should participate in. Additionally, the techniques disclosed herein can allow a user to select a particular benchmark price that the order should adhere to. For example and not limitation, the benchmark can be the settlement price or the closing price.

Next, the trading system can validate the MOC order. For example and not limitation, the trading system can check the order parameters received from the trader against exchange specified financial instrument data, such as symbol and last trade price. This data can be maintained in a database or server of the trading system. The order can also be checked against exchange specified customer account information, which can contain account information of the named customer or trader and types of trading the trader is approved to conduct. This data can also be maintained in a database or server of the trading system. If the trading system does not detect any discrepancies during the validation process, the order is transmitted to be executed on the exchange according to the execution model. The trading system can further check whether a validated order triggers regulatory and/or compliance requirements, such as for example reporting requirements, and can report the executed trade to the exchange specified regulatory and/or reporting entity based on the exchange specific validation rules. For example and not limitation, on certain exchanges, executed trades must be reported to a given reporting entity within a certain period of time after the trade is executed.

The techniques disclosed herein can encapsulate various exchange specific instrument level parameters behind one generic execution model, working across all derivatives exchanges, with consistent set of parameters, obviating the need of traders to recall or otherwise intervene or manually refer to the various exchange and/or instrument specific rules and instead rely on the trading system to keep track of various rules, parameters and variables to ensure the one or more orders executes at or better than the specified benchmark.

Figure 2:
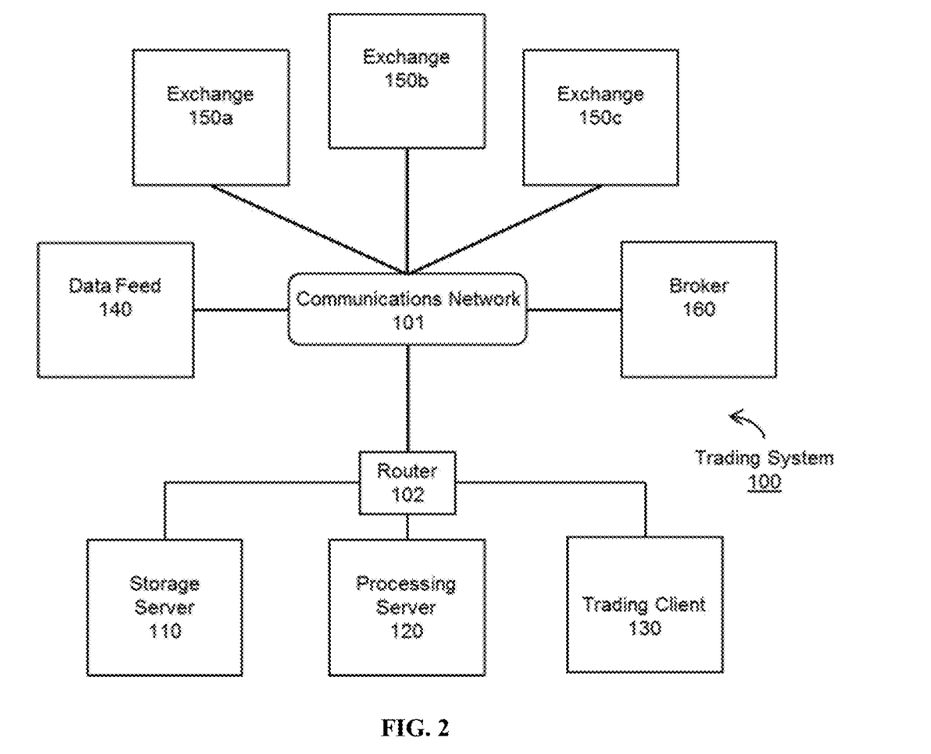
FIG. 2 is a schematic block diagram of one or more embodiments.

Reference will now be made to the embodiment of FIG. 2 for the purpose of illustration and not limitation. FIG. 2 is a block diagram showing a trading system 100 for managing and executing one or more MOC orders. In one embodiment, the trading system 100 executes orders for financial instruments at or near the end of the trading session of one or more exchanges 150a-c. The trading system 100 can comprise a computer-implemented system operably connected via an electronic communication network 101. According to one embodiment, a router (or other network switch or data transmission device) 102 communicably connects storage server 110, processing server 120, and trading client 130. The storage server 110 receives over the communications network 101 and router 102 settlement and/or order validation rules associated with the one or more exchanges 150a-c. The trading client 130 is configured with software to display order parameters that define an MOC order to be executed so that once a trader has entered the parameters defining the MOC order, the order entry is transmitted, such as by a standardized electronic communications protocol, to processing server 120.

In certain embodiments the router 102 can facilitate communication exchange between the electronic components of the trading system, including converting data received from the communications network 101 into a specific format understood by the storage server 110, processor server 120 and trading client 130.

In certain embodiments a data feed 140 can obtain and store real time and historical market data from one or more exchanges 150a-c.

The storage server 110, as embodied herein, can comprise one or more memory devices, including volatile and nonvolatile memory devices for receiving and storing exchange specific settlement rules. Additionally, the storage server 110 can comprise push and pull software for transmitting and receiving settlement rules and settlement rule updates from one or more exchanges 150a-c. Additionally or alternatively, the user can directly configure the settlement rules stored in the storage server 110 to be processed by the processing server 120, for example via a dialog entry. The storage server 110 can additionally receive and store exchange specific validation rules and validation rule updates from the one or more exchanges 150a-c. The storage server 110 can additionally or alternatively comprise a messaging component configured to transmit and receive messages according to a standardized communications protocol.

In certain embodiments the storage server 110 can receive and store real time and historical market data concerning financial instruments directly from the one or more exchanges 150a-c or from the data feed 140 transmitted over the communications network 101.

As herein disclosed, processing server 120 is configured to receive the exchange specific settlement and/or validation rules from storage server 110 and the order parameters from the trading client 130. In certain embodiments, the processing server 120 can check the order parameters against the exchange specific settlement rules and provision an execution model to execute the one or more MOC orders directly on the one or more exchanges 150a-c if the processing server has direct market access. In another embodiment, the processing server can process and transmit order entries to a broker 160 or dealer to have the MOC orders executed on one or more exchanges according to the provisioned execution model. One of skill in the art will appreciate that the MOC orders can be transmitted to the exchange either directly or indirectly. The execution model can comprise a closing strategy and closing strategy release time determined on the basis of the order parameters, stored settlement rules corresponding to the identified exchange and identified financial instrument, and/or other static data associated with the financial instrument.

As embodied herein, the processing server 120 can comprise one or more electronic components specifically configured to process market data, settlement rules corresponding to the identified exchange and identified financial instrument, order parameters and conditions defined by one or more order entry messages, as described in further detail below, and/or other static data associated with the financial instrument. The processing server 120 can comprise specialized software for transmitting and receiving communications via a standardized communications protocol. Accordingly, the one or more processors of the processor server 120 can be logically programmed to automatically and dynamically provision an execution model by which to execute MOC orders received from the trading client 130 according to the exchange specific settlement rules received from the storage server 110 such that the one or more orders can execute on one or more given exchanges 150a-c to match or beat the settlement price or other predetermined benchmark. Settlement rules include, for example, the mechanisms and timing of settlement price calculation. For example and not limitation, certain exchanges can calculate the settlement price by (1) taking the last sale price or quote price at the electronic market close, (2) by averaging the price over a short interval prior to close, (3) by calculating the volume weighted average price (VWAP) over a short interval prior to close, (4) by taking the price of a closing cross/auction, (5) by performing calculations related to a volatility curve, or (6) by other means known in the industry. Moreover, certain exchanges can calculate the settlement price at different times.

Additionally or alternatively, embodiments of the processor server 120 can be configured to run code defining a closing strategy received from the trading client 130 in order to process and execute one or more MOC orders corresponding to order entry messages received from the trading client 130. Thus, the processor server not only executes MOC orders based on execution parameters and conditions provided in order entry messages generated by the trading client 130, but also based on the exchange specific rules, thereby dynamically employing execution models permitted or mandated by the specific exchanges concerning the traded instrument.

In certain embodiments the processing server 120 can store and employ default order parameters for different financial instruments associated with different exchanges.

In certain embodiments the processing server 120 can be co-located at or near an exchange 150a-c in order to provide the lowest latency during order execution.

In certain embodiments the processing server 120 can receive and store real time and historical market data concerning financial instruments directly from the one or more exchanges 150a-c or from the data feed 140 over the communications network 101.

As embodied herein, the trading client 130 can include one or more electronic computing platforms such as a mobile device, PC, or computer with multiple processors. The computing platforms can further comprise memory devices such as volatile and/or non-volatile memory. The trading client 130 can include one or more display devices for presenting a graphical user interface of trader software and/or applications to a user. Further, the trading client 130 can comprise specialized software for transmitting and receiving communications via a standardized communications protocol. Additionally, the trading client 130 can generate order entry messages that include, among other things, trade instructions specifying parameters such as, but not limited to, the order type, size of the order, price limits, when the order can be executed, and where to present the order. The order entry messages can be generated via an order entry dialog box or other means such as via a standardized electronic communications protocol. The order entry messages can be transmitted over a communications network to be executed on an exchange. The trading client 130 is generally operated, controlled, and programmed by a user such as a human trader, but can also be operated by an electronic device.

In certain embodiments the trading client 130 can receive and store market data concerning financial instruments from the data feed 140 over the communications network 101.

In certain embodiments one or more orders can be sent to and executed by a broker 160 on the one or more exchanges 150a-c according to the execution model provisioned by the trading system.

Figure 3:
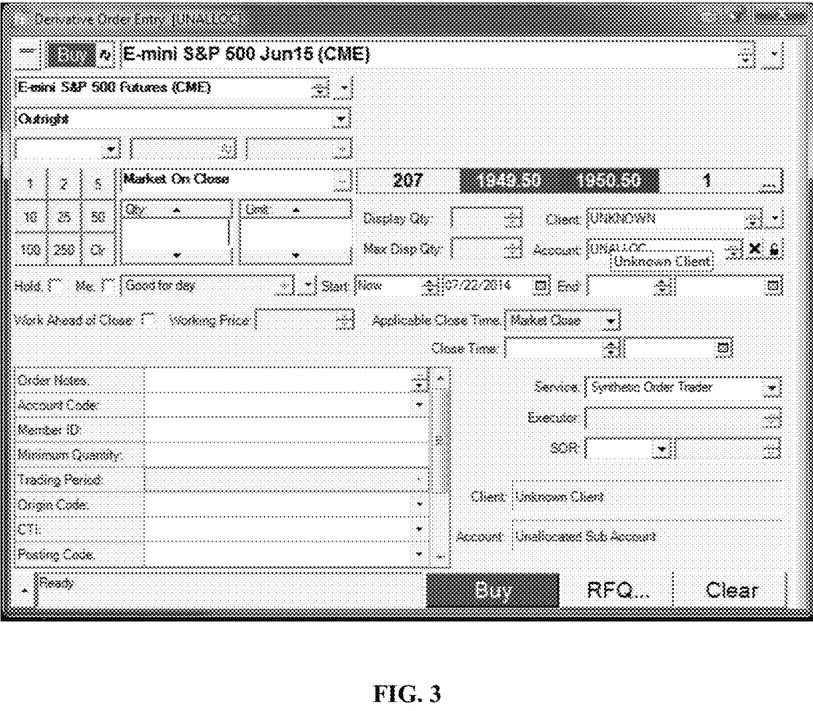
FIG. 3 is an exemplary order entry dialog display for defining a plurality of parameters concerning one or more orders of one or more embodiments.

For example and not limitation, FIG. 3 shows an order entry dialog display having a plurality of user-definable parameters. A trader can define parameters for a MOC order such as the exemplary parameters of the non-exhaustive list depicted in the table below.

| Parameter | Description |
| --- | --- |
| Limit | The limit price is optional. If it is not supplied, parent order is a market order. All child orders will abide by any stated limit price. |
| Start | The date/time, in user local time zone, at which the execution model will become active. If order is entered pre-open, the start time is the open time of the next continuous trading session. |
| Expiry Type | The type of expiry. |
| End | The time of order expiry and the time the execution model will stop processing an order. |
| Applicable Close Time | The closing time by which the model needs to have the order executed. |

With reference again to FIG. 2, in certain embodiments, the execution model can be an advanced order type model that allows traders to submit the MOC order using a trading system. In an exemplary embodiment, the execution model disclosed herein can specify a MOC order type that can be used to satisfy trading objectives such as (1) to trade at or better than the price of the last electronic trade of the trading day or (2) to trade at or better than the instrument's daily settlement price (which can require executing the order in accordance with the daily settlement procedure against the instrument's identified settlement time). In certain exemplary embodiments, the MOC order type disclosed herein can be made available via FIX or other suitable electronic message format. Additionally and/or alternatively, the MOC order type can be made available through an order entry dialog display. That is, for example, the trading system disclosed herein can receive MOC orders from traders using a standardized messaging protocol or via trader software adapted to display an order entry dialog with parameters for a MOC order.

Figure 4:
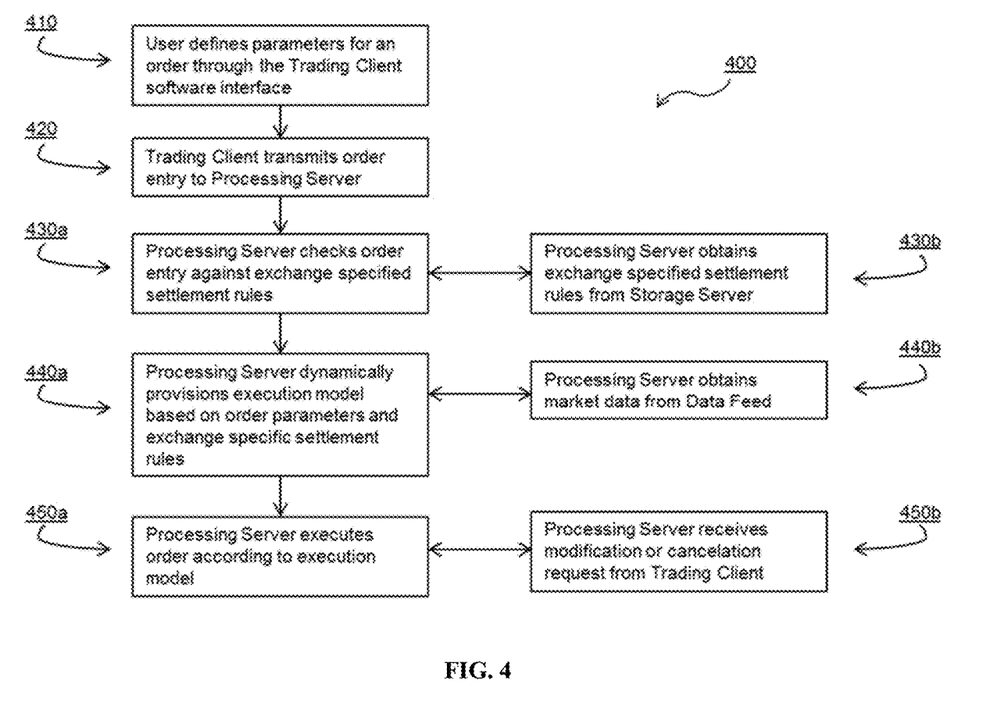
FIG. 4 is a flowchart for implementing one or more embodiments.

With reference to FIG. 4 for the purpose of illustration and not limitation, the trading system can be configured to store settlement rules corresponding to a plurality of exchanges and/or trading instruments and can be configured to execute user-defined MOC orders according to the rules specified by an exchange. For example and not limitation, the execution model can rely on exchange mandated settlement rules and settlement times, can accept the order prior to the settlement time and can manage the order according to parameters and details of an execution model permitted by an exchange for a given instrument. In this manner, a trader can enter a MOC order and corresponding parameters at step 410 and the trading system 100 can manage and process that order in accordance with corresponding settlement rules as further illustrated in the example flowchart 400 of one embodiment of the trading system method. Once the trading client receives order parameters from the user 410 through a software interface, such as an entry dialog, the trading client transmits the order entry message at block 420 to the processing server 120. The processing server 120 then obtains the exchange specific settlement rules from the storage server 110 at block 430a and checks the order against the settlement rules at block 430b. At blocks 440a and 440b, the processing server 120 can use logic to process market data obtained from data feed 140 and provision an execution model in accordance with the exchange specific settlement rules and user-defined the order parameters or default parameters if none are defined. Finally, in the embodiment of FIG. 4, the processing server 120 can submit an order at block 450a based on the provisioned execution model, or submit a modification or cancelation of an order as demonstrated by block 450b.

Figure 5:
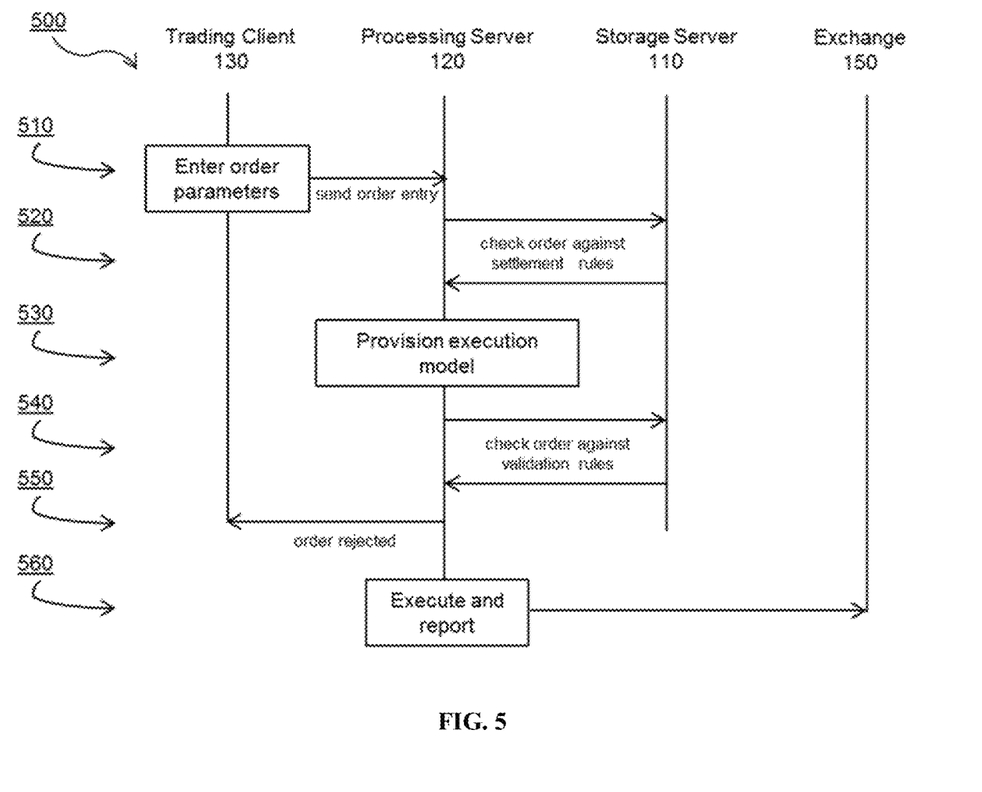
FIG. 5 is a timing diagram for implementing one or more embodiments.

FIG. 5 shows for the purpose of illustration and not limitation, an example timing diagram 500 of another embodiment of the trading system herein disclosed. In FIG. 5, the trading client 130, processing server 120, storage server 110, and exchange 150 are represented as vertical lines. Other features of the trading system are not shown in FIG. 5 for clarity, but it should be understood that such other features as router 102, or data feed 140, can be operated within the trading system over a communications network 101. The steps of one or more embodiments of the trading system are represented sequentially along the vertical lines at reference numbers 510-560.

As depicted in the embodiment of FIG. 5, for the purposes of illustration and not limitation, the trader can define parameters for a MOC order through an order entry dialog display and can transmit an order entry message according to a standardized communications protocol at step 510. Upon receiving the order entry message, the processing server 120 can check the order parameters against the exchange specific settlement rules obtained from the storage server 110 at step 520 and dynamically provision an execution model for executing the order based on the order parameters, closing strategy, closing strategy release time, and/or other static data associated with the financial instrument at step 530. As shown at step 540, in some embodiments of the disclosed trading system, the processing server 120 can also be configured to check the order against the exchange specific order validation rules obtained from the storage server 110. If the order does not comply with the exchange specific order validation rules, then the order can be rejected and transmitted to the trading client according to a standardized communications protocol at step 550. If the order complies with the exchange specific order validation rules, then the processing server 120 can execute the order directly on the exchange 150 according to provisioned execution model via a standardized communications protocol and make any compliance and/or regulatory reporting to an exchange specified regulatory reporting entity based on the exchange specific order validation rules at step 560.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method for managing Market-On-Close (MOC) orders, comprising: storing, in a trading system comprising one or more computing devices, one or more settlement rules associated with one or more exchanges, wherein the one or more settlement rules are associated with one or more financial instruments traded on the one or more exchanges; displaying, via a graphical user interface coupled with the trading system, an order entry dialog window illustrating a plurality of definable order parameters for at least one MOC order, wherein the plurality of definable order parameters includes a limit price parameter and at least one or more other parameters selected from the group consisting of a start parameter at which execution becomes active, an expiry type parameter, an end parameter which includes a time of order expiry and a processing stop time, and an applicable close time parameter, and wherein the order entry dialog includes at least one button configured to accept a first input corresponding to a buy confirmation; receiving, by the trading system, a MOC order having the one or more definable order parameters, the one or more definable order parameters identifying at least an exchange or a financial instrument; and executing a closing strategy at a calculated closing strategy release time, wherein executing the closing strategy includes transmitting one or more limit orders to an exchange.

2. The method of claim 1, wherein the one or more settlement rules associated with one or more exchanges comprises at least one of a plurality of types of contracts permitted to be traded, a plurality of types of assets to be traded, one or more contract size limits, a marking-to-market calculation associated with a type of asset, a minimum margin requirement associated with the type of contract, a maintenance margin requirement associated with the type of contract, a minimum margin deposit requirement associated with a type of participant, and trading hours.

3. The method of claim 1, wherein the one or more financial instruments is one or more futures contracts of a commodity, bond, currency, or stock.

4. The method of claim 1, wherein the executing is based on the plurality of definable order parameters and the stored settlement rules corresponding to the identified exchange.

5. The method of claim 1, wherein the receiving by the trading system the MOC order further comprises: receiving the MOC order having the one or more definable order parameters by a processing component of the trading system from a trading client of the trading system, wherein said trading client is configured to accept input defining the one or more order parameters from one or more end users via a dialog entry, and transmitting the MOC order having the one or more definable order parameters to the processing component to be executed.

6. The method of claim 5, wherein the receiving and transmitting of the MOC order having the one or more definable order parameters uses an electronic message format.

7. The method of claim 1, wherein determining the closing strategy comprises: calculating a volume-weighted average price of the financial instrument; calculating a time-weighted average price of the financial instrument; or calculating a percentage of volume.

8. The method of claim 1, wherein determining, based on one or more of the stored settlement rules corresponding to the identified exchange and the identified financial instrument and the closing strategy, the closing strategy release time comprises processing by a processing component of the trading system market data associated with the one or more financial instruments traded on the one or more exchanges.

9. The method of claim 1, wherein executing the closing strategy at the closing strategy release time comprises validating the MOC order according to one or more exchange specific order validation rules stored by the trading system and associated with the one or more exchanges.

10. The method of claim 9, wherein validating the MOC order according to the one or more exchange specific order validation rules comprises: checking the one or more order parameters against at least one of: customer account information; a symbol associated with the financial instrument on the exchange; a last trade price of the financial instrument; one or more compliance triggers; or one or more regulatory reporting triggers.

11. A system for managing Market-On-Close (MOC) orders, comprising: a trading system comprising one or more computing devices, each of which include one or more processors, in operable communication over a network, configured to: store market data and one or more settlement rules associated with one or more exchanges, wherein the one or more settlement rules are associated with one or more financial instruments traded on the one or more exchanges; display, via a graphical user interface coupled with the trading system, an order entry dialog a window illustrating a plurality of definable order parameters for at least one MOC order, wherein the plurality of definable order parameters includes a limit price parameter and at least one or more other parameters selected from the group consisting of a start parameter at which execution becomes active, an expiry type parameter, an end parameter which includes a time of order expiry and a processing stop time, and an applicable close time parameter, and wherein the order entry dialog includes a button, wherein the button is configured to accept a first input corresponding to a buy confirmation; receive one or more order parameters for generating one or more MOC orders; send the one or more MOC orders to the trading system, and wherein the trading system is in operable communication with the one or more exchanges; and execute a closing strategy at a calculated closing strategy release time, wherein executing the closing strategy includes transmitting one or more limit orders to an exchange.

12. The system of claim 11, further configured to store one or more order validation rules associated with the one or more exchanges.

13. The system of claim 11, further configured to execute the one or more MOC orders directly on the one or more exchanges.

14. The system of claim 13, further configured to validate the one or more MOC orders upon execution by checking the order parameters against the one or more stored order validation rules associated with the one or more exchanges.

15. The system of claim 11, further configured to transmit the one or more MOC orders to a broker associated with the one or more exchanges.

16. A non-transitory computer-readable medium storing instructions that, when executed by a processor causes a computer system to manage Market-On-Close (MOC) orders by performing the steps of: storing market data and one or more settlement rules associated with one or more exchanges, wherein the one or more settlement rules are associated with one or more financial instruments traded on the one or more exchanges; displaying, via a graphical user interface coupled with the trading system, an order entry dialog window illustrating a plurality of definable order parameters for at least one MOC order, wherein the plurality of definable order parameters includes a limit price parameter and at least one or more other parameters selected from the group consisting of a start parameter at which execution becomes active, an expiry type parameter, an end parameter which includes a time of order expiry and a processing stop time, and an applicable close time parameter, and wherein the order entry dialog includes at least one button, wherein the at least one button is configured to accept a first input corresponding to a buy confirmation; receiving one or more order parameters for generating one or more MOC orders: sending the one or more MOC orders to the trading system; receiving the one or more MOC orders; and executing a closing strategy at a calculated closing strategy release time, wherein executing the closing strategy includes transmitting one or more limit orders to an exchange.

17. The non-transitory computer-readable medium of claim 16, further storing one or more order validation rules associated with the one or more exchanges.

18. The non-transitory computer-readable medium of claim 16, further executing the one or more MOC orders directly on the one or more exchanges.

19. The non-transitory computer-readable medium of claim 18, further validating the one or more MOC orders upon execution by checking the order parameters against the one or more stored order validation rules associated with the one or more exchanges.

20. The non-transitory computer-readable medium of claim 16, further transmitting the one or more MOC orders to a broker associated with the one or more exchanges.

* * * * *